Aug. 19, 1969     T. J. FUNARI     3,461,927
STUMP SPLITTER
Filed Oct. 30, 1967     2 Sheets-Sheet 1
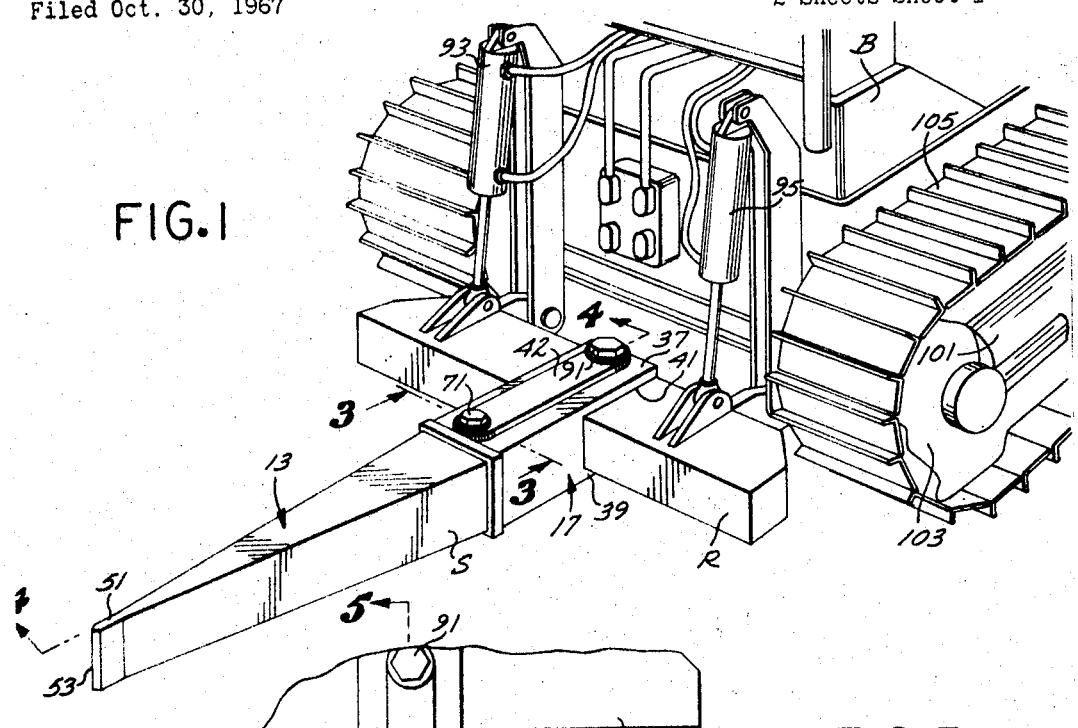
FIG. 1
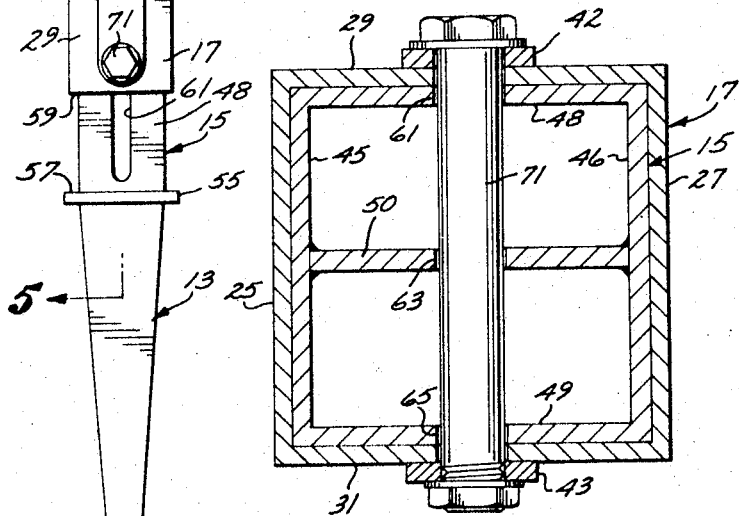
FIG. 2
FIG. 3
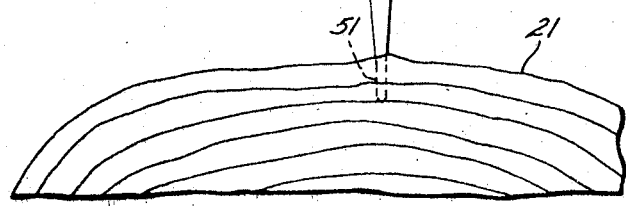
INVENTOR.
THOMAS J. FUNARI Aug. 19, 1969  T. J. FUNARI  3,461,927
STUMP SPLITTER Filed Oct. 30, 1967  2 Sheets-Sheet 2

INVENTOR.
THOMAS J. FUNARI
BY *Fulwider, Patton Rieber,*
*Lee and Utecht*
ATTORNEYS United States Patent Office 3,461,927
Patented Aug. 19, 1969

3,461,927
STUMP SPLITTER
Thomas J. Funari, Box 597,
Brookings, Oreg. 97415
Filed Oct. 30, 1967, Ser. No. 679,131
Int. Cl. B27c 9/00
U.S. Cl. 144—2                                      6 Claims

ABSTRACT OF THE DISCLOSURE

A stump splitter including a frame having means for attaching it to the rear of a tractor. A housing depends from the frame and forms a rearwardly opening slide passage, the rearward extremity of the wall of such housing defining a rearwardly facing hammer surface. A slider projects into the slide passage and includes a forwardly facing hammer surface for being hammered by the rearwardly facing hammer surface. A rearwardly pointing wedge depends from the slider and terminates, at its rearwardly extremity, in a vertical cutting edge. The slider is coupled to the housing to limit forward movement of the housing relative to the slider and to enable the housing to reciprocate on such slider to hammer the rearwardly facing hammer surface against the forwardly facing hammer surface.

BACKGROUND OF THE INVENTION

Field of the invention

The present invention relates to tractor driven stump splitters.

Description of the prior art

Tractor driven stump splitters known to applicant are characterized by the disadvantage that only the engine power of the tractor can be utilized to split a stump. There are no stump splitters, known to applicant, which can be started into a stump and the tractor then, alternately, driven forwardly and rearwardly to utilize the rearward momentum of the tractor to drive the splitter progressively into the splitting stump.

SUMMARY OF THE INVENTION

The stump splitter of present invention includes a housing that mounts on the rear of a tractor and forms a rearwardly opening slide passage. A slider is received in the passage and supports a rearwardly projecting splitting wedge. Forwardly and rearwardly facing hammer surfaces are formed by the slider and housing, respectively, whereby the tractor may be, alternatively, driven forwardly and rearwardly to utilize the rearward momentum of the tractor to hammer the splitting wedge into a stump.

Other objects and features of the invention will become apparent from consideration of the following description taken in connection with the accompanying drawings.

DESCRIPTION OF THE DRAWINGS

FIG. 1 is a partial perspective view of a stump splitter embodying the present invention and mounted on the rear of a bulldozer;

FIG. 2 is a top view of the stump splitter shown in FIG. 1;

FIG. 3 is a transverse vertical sectional view, in enlarged scale, taken along the lines 3—3 of FIG. 1;

DESCRIPTION OF THE PREFERRED EMBODIMENT

A stump splitter S embodying the present invention is shown in FIG. 1 attached to a bulldozer B by means of a hydraulic actuated ripper bar R. Generally, a rearwardly pointing wedge 13 depends from a slider 15 which is slidably received in a housing 17. Thus, the wedge 13 can be started into a stump 21, as shown in FIG. 2, and the bulldozer B driven, alternately, forwardly and rearwardly to hammer the housing 17 against the slider 15 to drive the wedge 13 into the stump 21.

Figure 4:
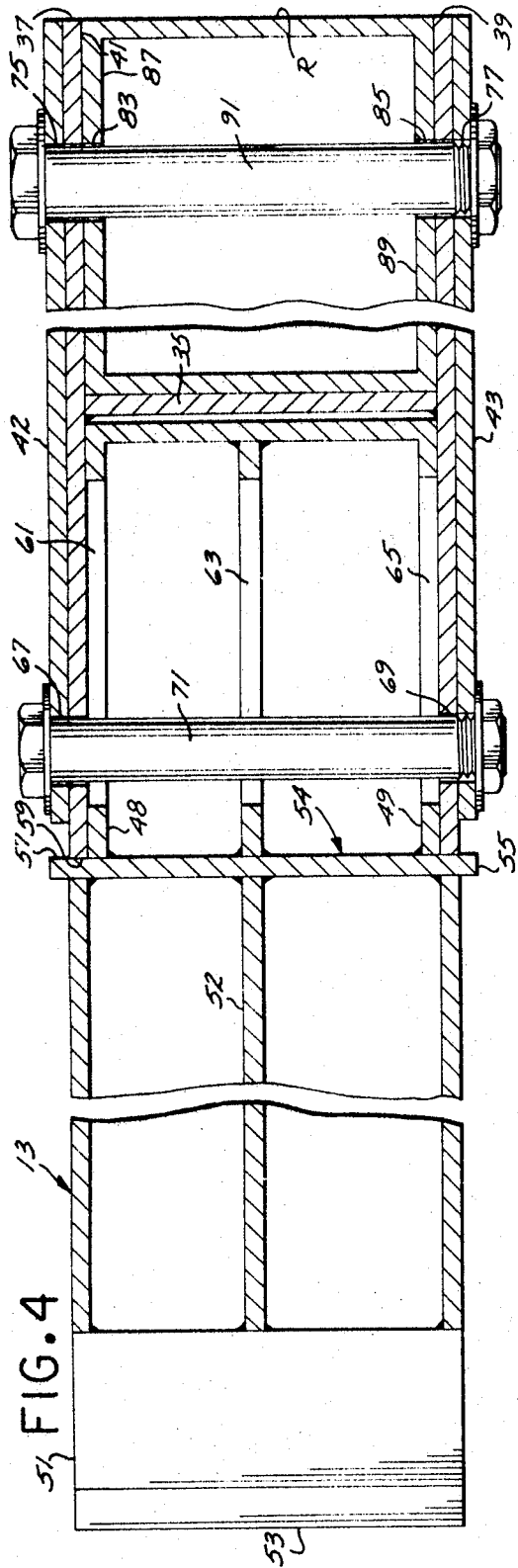
FIG. 4 is a broken longitudinal vertical sectional view, in enlarged scale, taken along the lines 4—4 of FIG. 1.

Referring to FIGS. 3 and 4, the housing 17 is square in vertical cross section and includes a pair of side walls 25 and 27 and top and bottom walls 29 and 31, respectively. The walls 25, 27, 29, and 31 cooperate to define a slide passage 33 that is open at its rearward end. A vertical wall 35 (FIG. 4) that defines the front of the passage 33 and is disposed adjacent the ripper bar R. Referring to FIG. 1, the side walls 25 and 27 are cut on their forward ends to form upper and lower jaws 37 and 39 which cooperate to define a rectangular-shaped forwardly facing opening 41 for receiving the ripper bar R. A pair of longitudinal reinforcing plates 42 and 43 are disposed centrally on, and welded to, the top and bottom walls 29 and 31, respectively.

The slider 15 is square in cross-section for being received in the housing 17 and includes a pair of side walls 45 and 46 and top and bottom walls 48 and 49, respectively. With continued reference to FIG. 3, a horizontal reinforcing wall 50 is disposed intermediate the top and bottom walls 48 and 49, respectively, and is welded, at its edges, to the walls 45 and 46.

The wedge 13 is generally triangular when viewed in plan and includes a horizontal reinforcing wall 52. The rear portion of the wedge 13 is in the form of a relatively narrow stinger 51 which terminates in a vertical cutting edge 53.

Referring to FIGS. 2 and 4, a vertical plate, generally designated 54, is interposed between the slider 15 and wedge 13 and projects outwardly beyond the periphery of the slider 15 to form a peripheral border 55. The front surface of the border 55 forms a forwardly facing hammer surface 57 for being abutted by the rearwardly facing hammer surface 59 defined by the rear extremity of the housing 17.

Referring to FIGS. 3 and 4, the slider 15 includes three vertically aligned longitudinal slots 61, 63, and 65 formed in its top wall 48, reinforcing wall 50, and bottom wall 49, respectively. Referring to FIGS. 1 and 3, a vertical bore 67 is formed at the rearward extremity of the top reinforcing plate 42 and projects downwardly through the top wall 29 of the slider 15 and is aligned with the slots 61, 63, and 65. A like bore 69 is formed at the rearward extremity of the bottom reinforcing plate 43 and projects upwardly through the bottom wall 31 of the slider 15, is aligned with the bore 67 and slots 61, 63, and 65. A bolt 71 is extended through the bores 67 and 69 and slots 61, 63, and 65 for retaining the slider 15 for longitudinal reciprocation relative to the housing 17. Referring to FIGS. 1 and 4, aligned vertical bores 75 and 77 are formed near the forward extremity of the reinforcing plates 42 and 43, respectively, and extend through the top and bottom walls 29 and 31, respectively. With continued reference to FIG. 4, a pair of vertically aligned bores 83 and 85 are formed in the top and bottom walls 87 and 89, respectively, of the ripper bar R and a bolt assembly 91 is extended through the bores 75, 77, 83, and 85 for attaching the stump splitter to the ripper bar R.

In operation, the stump splitter S is attached to the ripper bar R by backing the bulldozer B into position with the ripper bar received in the opening 41 formed between the jaws 37 and 39. The bolt assembly 91 is then installed to secure the housing 17 to the ripper bar. The ripper bar R, and consequently the splitter S, can be raised and lowered by conventional hydraulic cylinders 93 and 95 (FIG. 1).

Figure 5:
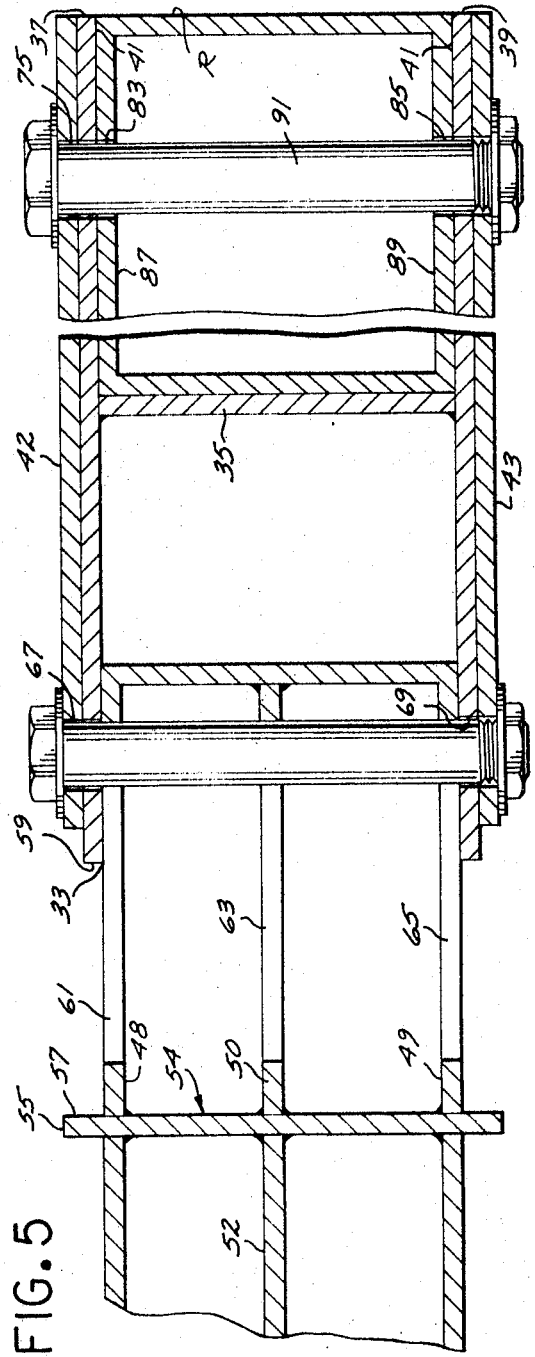
FIG. 5 is a broken longitudinal vertical sectional view, similar to FIG. 4.

When it is desirable to split a large stump, the bulldozer is backed towards the stump until the stinger 51 makes contact with the stump. This initial contact can be made with the desired speed of the bulldozer B to cause the stinger 51 to cut into the stump 21. In the case of relatively small stumps, this initial pass will be sufficient to split the stump for removal but for larger stumps, as for instance 15 foot diameter stumps, the force of the rearwardly moving bulldozer will not be sufficient to split the stump. In such cases when the bulldozer has pushed the wedge 13 as far into the stump as possible, it will lose traction and commence to spin its tracks. The bulldozer B can then be moved ahead to slide the housing 17 forward on the slider 15 a distance sufficient to bring the bolt assembly 71 to the front end of the slots 61, 63, and 65, as shown in FIG. 5. The bulldozer B can then be brought rearwardly and the full impact of the rearwardly moving bulldozer will be imparted to the forwardly facing hammer surface 57 formed by the border 55 thus driving the wedge 13 deeper into the stump 21. This alternate forwardly and rearwardly movement of the bulldozer B can be continued until the wedge 13 is driven a sufficient distance into the stump 21 to split it in the longitudinal direction of the wedge 13. The bulldozer may then be moved forwardly to retrieve the stump splitter S from the split stump 21 and then repositioned perpendicular to the direction in which the stump 21 was split. The splitter S can then be driven into the stump 21 to split it in a direction perpendicular to the direction in which it was originally split. In this manner the stump 21 can be split into as small of sections as desired for convenient removal.

It is of particular advantage that the D9 model bulldozers sold under the trademark "Caterpillar" have massive coil springs carried in cylindrical barrels 101 (FIG. 1) which press the rear track sprockets 103 away from the front track sprockets (not shown) to maintain tension on the tracks 105. When a bulldozer B of this type is powered rearwardly against the resistance of the stump 21, the rearwardly forcing torque on the front track sprocket (not shown) will cause the coil springs in the barrels 101 to compress and slack will be developed in the top run of the tracks 101. When the bulldozer clutch is depressed, the compressed springs in the barrels 101 will expand moving the rear track sprocket 103 rearward with respect to the bulldozer B causing the bulldozer to move forward. The forward momentum of the bulldozer B will be adequate to carry it a sufficient distance forward to pull the housing 17 forwardly on the slider 15. During the described forward movement, the bulldozer B can be left in reverse and when the bolt 71 reaches the front of the notches 61, 63, and 65, the bulldozer B will be braked and the clutch again released to force the bulldozer again rearwardly to hammer the wedge 13 into the stump 21.

From the foregoing it will be apparent that the stump splitter of present invention is of straightforward design, rugged construction and economical to manufacture. The stump splitter S has particular utility for splitting the stumps of giant redwoods or other extremely large trees, thus enabling a stump, which formely had to be blasted, to be removed in a relatively short period of time.

Various modifications and changes may be made with regard to the foregoing detailed description without departing from the spirit of the invention or the scope of the following claims.

I claim:
1. A stump splitter comprising:
   a frame including mounting means for attaching said frame to the rear of a tractor;
   a housing on said frame and including a rearwardly opening slide passage;
   a rearwardly facing hammer surface supported from said housing;
   a slider shaped to complement cross section of said passage;
   a forwardly facing hammer surface on said slider for being abutted by said rearwardly facing hammer surface;
   a rearwardly pointing wedge carried from said slide and having a vertically extending cutting edge; and
   coupling means interconnecting said housing and slider for enabling reciprocation of said housing relative to said slide whereby said rearwardly facing hammer surface can be hammered against said forwardly facing hammer surface to drive said wedge into a stump.
2. A stump splitter as set forth in claim 1 wherein:
   said wedge has a relatively wide horizontal cross section and includes a stinger interposed between said wedge and said cutting edge, said stinger having a relatively narrow horizontal cross section.
3. A stump splitter as set forth in claim 1 wherein the rear end of said housing forms said rearwardly facing hammer surface.
4. A stump splitter as set forth in claim 1 that includes:
   a peripheral frame around said slider which forms said forwardly facing hammer surface.
5. A stump splitter as set forth in claim 1 wherein said coupling means includes:
   a pin receiving slot in said slider, said slot being elongated in the forward and rearward direction;
   a pin supported from said housing and projecting into said slot for abutting the forward end of said slot to limit forward movement of said housing on said slider.
6. A stump splitter as set forth in claim 1 wherein said stump splitter is adapted to be attached to the horizontal ripper bar of a bulldozer, said ripper bar having a vertical bolt receiving bore and wherein said housing includes:
   a pair of forwardly opening vertically spaced jaws, said jaws including vertically aligned through bolt receiving bores.

References Cited
UNITED STATES PATENTS

| | | | |
|---|---|---|---|
| 1,032,481 | 7/1912 | Hunter | 144—193 |
| 1,666,795 | 4/1928 | Schmidt | 144—193 |
| 1,803,902 | 5/1931 | Grupe | 144—193 |
| 2,474,037 | 6/1949 | Cuthrell | 144—193 |

GERALD A. DOST, Primary Examiner

U.S. Cl. X.R.

144—193